US012774388B2

(12) United States Patent
Zhu et al.

(10) Patent No.: US 12,774,388 B2
(45) Date of Patent: Oct. 27, 2026

(54) ENERGY ABSORBING FOAM MATERIAL AND METHOD OF USING THEREOF

(71) Applicant: Nano and Advanced Materials Institute Limited, Hong Kong (HK)

(72) Inventors: Yong Zhu, Hong Kong (HK); Jianping Han, Hong Kong (HK); Chenmin Liu, Hong Kong (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 438 days.

(21) Appl. No.: 18/537,825

(22) Filed: Dec. 13, 2023

(65) Prior Publication Data

US 2024/0110059 A1 Apr. 4, 2024

Related U.S. Application Data

(63) Continuation-in-part of application No. 17/460,330, filed on Aug. 30, 2021, now abandoned.

(60) Provisional application No. 63/084,589, filed on Sep. 29, 2020.

(51) Int. Cl.

| | |
|---|---|
| ***B29C 41/00*** | (2006.01) |
| ***B29C 41/46*** | (2006.01) |
| ***B29K 75/00*** | (2006.01) |
| ***C08G 18/16*** | (2006.01) |
| ***C08G 18/18*** | (2006.01) |
| ***C08G 18/24*** | (2006.01) |
| ***C08G 18/48*** | (2006.01) |
| ***C08G 18/76*** | (2006.01) |
| ***C08L 75/04*** | (2006.01) |

(52) U.S. Cl.

CPC ............ *C08L 75/04* (2013.01); *B29C 41/003* (2013.01); *B29C 41/46* (2013.01); *B29K 2075/00* (2013.01); *B29K 2995/0077* (2013.01); *B29K 2995/0091* (2013.01); *C08L 2201/12* (2013.01); *C08L 2203/14* (2013.01)

(58) Field of Classification Search

CPC .................................................... B29C 44/355

See application file for complete search history.

(56) References Cited

U.S. PATENT DOCUMENTS

| | | | |
|---|---|---|---|
| 2004/0079670 A1 | 4/2004 | Sendijarevic et al. | |
| 2013/0298317 A1 | 11/2013 | Fonte et al. | |
| 2014/0128491 A1* | 5/2014 | Hayashi ............ | C08G 18/4825 521/174 |
| 2015/0272591 A1* | 10/2015 | Folan .............. | A61B 17/12136 606/191 |

FOREIGN PATENT DOCUMENTS

| | | |
|---|---|---|
| CA | 2113362 A1 * | 1/1994 |
| CN | 1091753 A | 9/1994 |
| CN | 108424649 A | 8/2018 |
| CN | 110183614 A | 8/2019 |
| JP | 2007268949 A | 10/2007 |

OTHER PUBLICATIONS

Wenbo Luo et al. "Frequency- and strain-amplitude-dependent dynamical mechanical properties and hysteresis loss of CB-filled vulcanized natural rubber." International Journal of Mechanical Sciences, 52, 2010, p. 168-174.

New Chemical Materials, "Preparation of high density filling shape memory polyurethane foam", 2017.

Office Action of corresponding China Patent Application No. 202111146961.X mailed on Mar. 24, 2023.

2nd Office Action of corresponding China Patent Application No. 202111146961.X mailed on Sep. 23, 2023.

* cited by examiner

*Primary Examiner* — Melissa A Rioja

(74) *Attorney, Agent, or Firm* — IDEA Intellectual Limited; Sam T. Yip

(57) ABSTRACT

The present invention provides an energy absorbing foam material includes at least one shape memory polymer foam having a non-impact resistant configuration in a first force-application time, an impact resistant configuration in a second force-application time at a working temperature, a first glass transition temperature equal to or lower than a working temperature in the first force-application time, and a second glass transition temperature higher than a working temperature in the second force-application time. A second elastic modulus of the shape memory polymer foam in the second force-application time is at least 10 times than a first elastic modulus of the shape memory polymer form in the first force-application time at the working temperature.

12 Claims, 3 Drawing Sheets

ENERGY ABSORBING FOAM MATERIAL AND METHOD OF USING THEREOF

CROSS-REFERENCE TO RELATED APPLICATION

The present application is a continuation-in-part of U.S. patent application Ser. No. 17/460,330, filed on Aug. 30, 2021, which claims priority from U.S. provisional patent application No. 63/084,589 filed on Sep. 29, 2020, the disclosures of which are incorporated herein by reference in its entirety.

TECHNICAL FIELD

The present invention provides an energy absorbing foam material and method of using thereof. More specifically, the energy absorbing foam material is in a non-impact resistant configuration in a long force application time, in an impact resistant configuration in a short force application time, a first glass transition temperature equal to or lower than a working temperature in the first force-application time, and a second glass transition temperature higher than a working temperature in the second force-application time.

BACKGROUND

In our daily life, people might get injured in dangerous work environments (building site or fire scene), unavoidable natural disasters (earthquake or tsunami) and in some intense exercises (football or car racing). Traditionally, many materials, for example, metals, ceramics and composites, have been used to absorb the impact energy and maintain the structure integrity so as to prevent injury. However, these materials are usually heavy, rigid and inflexible, which would limit the applications in the modern society. Recently, shear thickening fluid or shear thickening polymer, a kind of non-Newtonian material, have attracted great attention for their practical applications as an impact resistant material. As for shear thickening fluid, they are usually concentrated colloidal suspensions composed of non-aggregating particles suspended in fluids. The viscosity would increase sharply once the external shear stress is beyond a critical shear rate. As for shear thickening polymer, it presents as a soft polymer viscoelastic material in normal condition. Furthermore, the storage modulus increases dramatically once it is rapidly hit by an external shear stress. However, both of these materials have distinct drawbacks, such as stability, leakage and seal problem. The leakage and seal problem would lead to complex manufacturing process and higher cost. In addition, due to the higher density of these materials, the products comprised of these materials are usually too heavy which limit the transportation and their applications.

Therefore, in view of the above disadvantages, there is a need to provide an energy absorbing material which is light-weighted, flexible, self-supported, cost effective, and impact resistant in a short force application time.

SUMMARY OF THE INVENTION

In view of the foregoing problem, this disclosure provides an energy absorbing foam material and method of using thereof.

Accordingly, one aspect of the present invention provides an energy absorbing foam material includes at least one shape memory polymer foam. The shape memory polymer foam includes a non-impact resistant configuration in a first force-application time, and an impact resistant configuration in a second force-application time at a working temperature ranging from 15° C. to 55° C. Meanwhile, the shape memory polymer foam has a first glass transition temperature equal to or lower than a working temperature in the first force-application time, and a second glass transition temperature higher than a working temperature in the second force-application time. The non-impact resistant configuration comprises a deformed configuration and an original configuration. A second elastic modulus of the shape memory polymer foam in the second force-application time is at least 10 times than a first elastic modulus of the shape memory polymer form in the first force-application time at the working temperature. The first force-application time is approximately from 0.1 second to 1000 seconds and the second force-application time is approximately below 0.1 second.

In one embodiment of the present invention, the shape memory polymer foam is a polyurethane foam formed by a reaction between polyol and a mixture of 4 4'-methylenebis (phenyl isocyanate) and 2,4-methylenebis(phenyl isocyanate).

In one embodiment of the present invention, the yield point of the shape memory foam is approximately from 0.5 kPa to 1 MPa.

In one embodiment of the present invention, the polyol content constitutes 55-70% of the total weight, and the mixture of 4,4'-methylenebis(phenyl isocyanate) and 2,4-methylenebis(phenyl isocyanate) content constitutes 25-45% of the total weight.

Preferably, the polyol and the mixture of 4,4'-methylenebis(phenyl isocyanate) and 2,4-methylenebis(phenyl isocyanate) have a weight ratio of 10:7.

In one embodiment of the present invention, the mixture of 4,4'-methylenebis(phenyl isocyanate) and 2,4-methylenebis(phenyl isocyanate) constitute 40-45% of the total weight of the polyurethane foam, and wherein the content of 4,4'-methylenebis(phenyl isocyanate) constitutes 40-60% of the total weight of the mixture and the content of 2,4-methylenebis(phenyl isocyanate) constitutes 40-60% of the total weight of the mixture.

In one embodiment of the present invention, the 4,4'-methylenebis(phenyl isocyanate) and the 2,4-methylenebis (phenyl isocyanate) have a weight ratio of 1:1.

In one embodiment of the present invention, the second elastic modulus of the shape memory polymer foam in the second force-application time is 100 times than the first elastic modulus of the shape memory polymer form in the first force-application time at 45° C.

In one embodiment of the present invention, it provides an impact-resistant article having said energy absorbing foam material of the present invention.

In one aspect of the present invention, it also provides a method of molding the energy absorbing foam, which includes (1) providing the energy absorbing foam material having an original shape; (2) at a force-application time less than approximately 0.1 second to 1000 seconds and at a working temperature range approximately from 15° C. to 55° C., molding the energy absorbing foam material around a shape to be protected by the energy absorbing foam material; (3) using the molded energy absorbing foam material at a temperature range approximately from 15° C. to 55° C.; (4) self-recovering the original shape of the energy absorbing foam material without the application of force or heat.

In one aspect of the present invention, the energy absorbing foam material is a polyurethane foam formed by a reaction between polyol and a mixture of 4 4'-methylenebis (phenyl isocyanate) and 2,4-methylenebis(phenyl isocyanate). The polyol content constitutes 55-70% of the total weight, and the mixture of 4,4'-methylenebis(phenyl isocyanate) and 2,4-methylenebis(phenyl isocyanate) content constitutes 25-45% of the total weight.

Preferably, the polyol and the mixture of 4,4'-methylenebis(phenyl isocyanate) and 2,4-methylenebis(phenyl isocyanate) have a weight ratio of 10:7.

In one aspect of the present invention, the mixture of 4,4'-methylenebis(phenyl isocyanate) and 2,4-methylenebis (phenyl isocyanate) constitute 40-45% of the total weight of the polyurethane foam, and the content of 4,4'-methylenebis (phenyl isocyanate) constitutes 40-60% of the total weight of the mixture and the content of 2,4-methylenebis(phenyl isocyanate) constitutes 40-60% of the total weight of the mixture.

Preferably, the 4,4'-methylenebis(phenyl isocyanate) and the 2,4-methylenebis(phenyl isocyanate) have a weight ratio of 1:1.

In one aspect of the present invention, the yield point of the energy absorbing foam material is approximately from 25 kPa to 0.23 MPa.

BRIEF DESCRIPTION OF THE DRAWINGS

The disclosure will become more fully understood from the detailed description given herein below for illustration only, and thus not limitative of the disclosure, wherein.

DEFINITIONS

Figure 1:
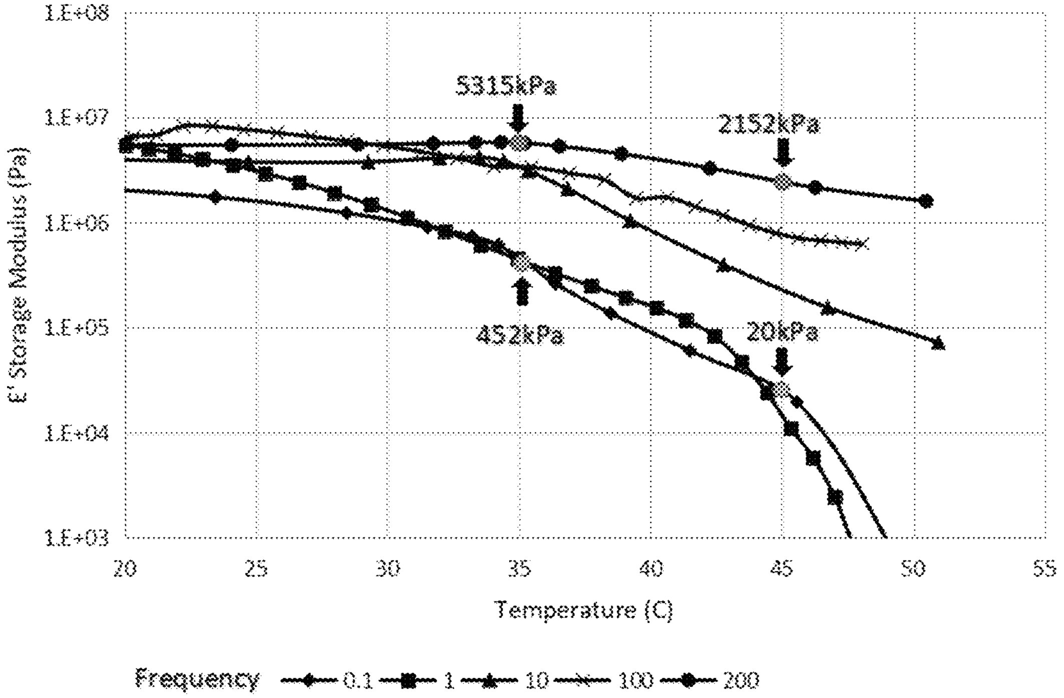
FIG. 1 illustrates the diagram showing the storage modulus of the energy absorbing foam material in the present invention is related to the temperature and frequency.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

The term "shape memory polymer foam" used herein, refers to a unique class of polymers or materials which is fabricated through foaming process and exhibit the ability to fix at a prior state shape or a non-impact resistant configuration with a lower elastic modulus and then shift to a temporary state or an impact resistant configuration by an external stimulus. Examples of shape memory polymers foam used in the present invention include, but are not limited to polyurethane foam, polystyrene foam, silicon rubber foam, polyvinyl chloride foam, ethylene-vinyl acetate foam, and polyester block co-polymer foam.

DETAILED DESCRIPTION

The following disclosure provides many different embodiments or examples for implementing different features of the provided subject matter. Specific examples of components and arrangements are described below. Certainly, these descriptions are merely examples and are not intended to be limiting. The embodiments of the present disclosure are described in detail below. However, it should be understood that many applicable concepts provided by the present disclosure may be implemented in a plurality of specific environments. The described specific embodiments are only illustrative and do not limit the scope of the present disclosure.

According to the present invention, there is provided an energy absorbing foam material which is in a non-impact resistant configuration in a long force-application time, and in an impact resistant configuration in a short force-application time. The long force-application time is approximately from 0.1 second to 1000 seconds, and the short force-application time is approximately below 0.1 second. Under the short force-application time, the elastic modulus of the energy absorbing foam material is approximately 10 times than that under the long force-application time, indicating the energy absorbing foam material is suitable to offer a degree of impact protection. The transition from low elastic modulus (non-impact configuration) to high elastic modulus (impact configuration) is rapid without time delay.

The selection of these specific components and their proportions has been carefully considered to strike a balance between material strength, flexibility, and energy-absorbing capabilities.

In one embodiment of the present invention, the energy absorbing foam material includes a polyol content ranging from 55% to 70% of the total weight. For example, the content of the polyol can be 55%, 56%, 57%, 58%, 59%, 60%, 61%, 62%, 63%, 64%, 65%, 66%, 67%, 68%, 69%, or 70%. In addition, the energy absorbing foam material also includes a polyol content ranging from 25% to 45% of the total weight. For example, the content of the mixture can be 25%, 26%, 27%, 28%, 29%, 30%, 31%, 32%, 33%, 34%, 35%, 36%, 37%, 38%, 39%, 40%, 41%, 42%, 43%, 44%, or 45%.

Preferably, the weight ratio between the polyol and the isocyanate mixture is defined as 10:7. For example, for every 100 g of polyol used, 70 g of the isocyanate mixture are employed.

Furthermore, the mixture of 4,4'-methylenebis(phenyl isocyanate) and 2,4-methylenebis(phenyl isocyanate) constitutes 40% to 45% of the total weight. This specific combination of isocyanates plays a significant role in determining the foam's structural properties and energy absorption capabilities. For example, the content of the mixture of 4,4'-methylenebis(phenyl isocyanate) and 2,4-methylenebis (phenyl isocyanate) can be 40%, 41%, 42%, 43%, 44%, or 45%.

Additionally, within this mixture, the content of 4,4'-methylenebis(phenyl isocyanate) ranges from 40% to 60%, while the content of 2,4-methylenebis(phenyl isocyanate) also ranges from 40% to 60%. These specific concentration ranges contribute to the foam's ability to absorb and dissipate energy effectively.

Preferably, the content of 4,4'-methylenebis(phenyl isocyanate) is 50%, while the content of 2,4-methylenebis (phenyl isocyanate) is 50%.

In one embodiment of the present invention, the energy absorbing foam material is flexible and resilient to various kinds of loading, for example, but not limited to, compression, tension, shear, and torsion. Further, it has the ability to adapt the geometry figures/shapes of what it is designed and maintain intimate contact to the protected subject. This is very crucial for being as a protecting material because the induced damage is related to the maximum force resulting from the impact divided by the area over which the force is applied. The energy absorbing foam material in the present invention is able to absorb the impact energy and reduce the force in the area where the force is applied, therefore the stress and pressure of the impact is significantly decreased. In one embodiment of the present invention, the energy absorbing foam material contacted intimately and was able to delineate the shape of the subject while applying forces in the corresponding ends at approximately 10 seconds.

The energy absorbing foam material disclosed in the present invention comprises at least one shape memory polymer foam and additives. The shape memory polymer foam, for example, but not limited to polyurethane foam, polystyrene foam, silicon rubber foam, polyvinyl chloride foam, ethylene-vinyl acetate foam, and polyester block co-polymer foam. Further, the amount of shape memory polymer foam is at least approximately 50 with respect to the weight thereof. The additives, for example, but not limited to anti-oxidant, flame retardant, inorganic fillers and the amounts of additives is less than approximately 50% with respect to the weight thereof.

The foam material provided in the present invention is in a closed cell foam or an open cell foam. The cell includes, for example, but not limited to gas, vapor or blowing agents. The gas for example, is nitrogen or carbon dioxide. Usually, the gas or vapor would disperse uniformly in the material or non-uniformly according the applications in some embodiments. The presence of gas or vapor within the foam material not only reduce the overall density of the foam material but also provide cushion in the foam material due to the pneumatic effect. These pneumatic damping is crucial for energy absorption and dissipation when the impact suddenly occurs.

The elastic modulus of the energy absorbing foam material in the present invention is influenced by factors, for example, but not limit to temperature, force-application time, loading, or frequency. Referring to FIG. 1, it showed the elastic modulus of the energy absorbing foam material at the force-application time approximately 0.005 to 0.01 seconds (i.e. with the frequency approximately from 100 to 200 Hz) is approximately 10 times larger than that at the force-application time approximately 1 to 10 seconds (i.e. with the frequency approximately from 0.1 to 1 Hz) at 35° C. Further, the difference of elastic modulus increased to approximately 100 times at the temperature over 45° C.

Figure 2:
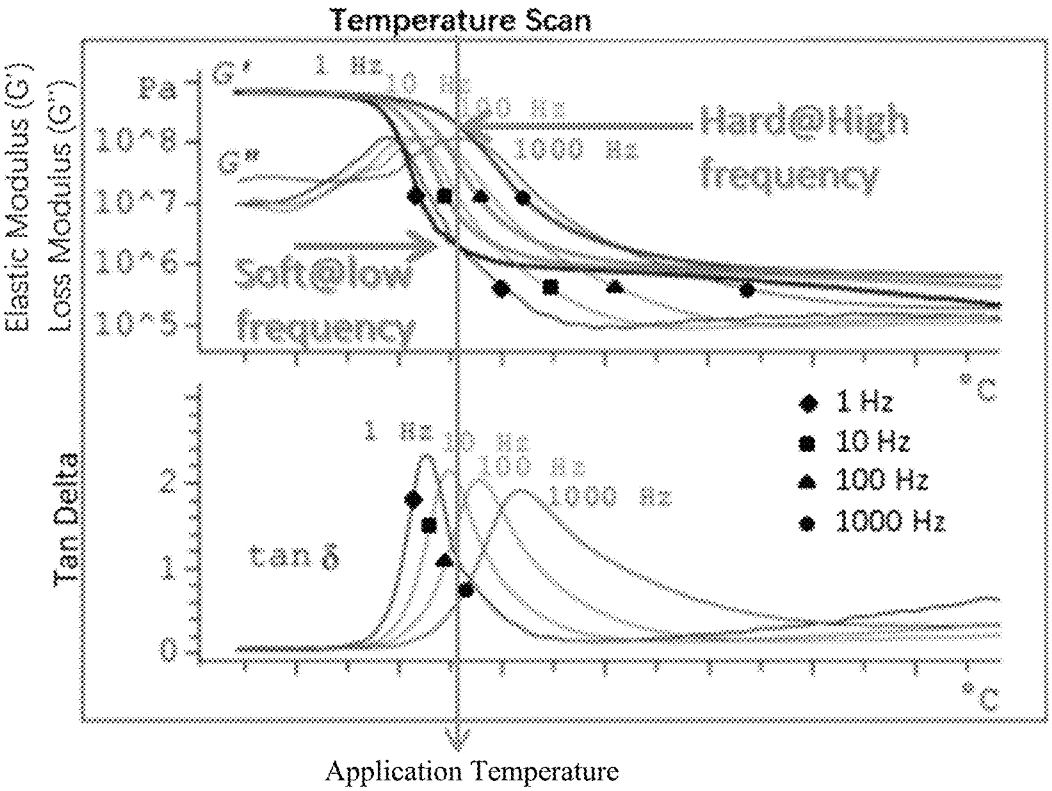
FIG. 2 illustrates the diagram further showing the Elastic/Loss Modulus and Tan delta of the energy absorbing foam material in the present invention is related to the temperature and frequency.

As shown in FIG. 2, the glass transition temperature of the energy absorbing foam material in the present invention is equal to or lower than the application temperature (such as 35° C.) at the force-application time approximately 0.1 to 1 seconds (i.e. with the frequency approximately from 1 to 10 Hz), which indicates the foam material is in rubbery state and behaves soft and flexible. Furthermore, the glass transition temperature of the energy absorbing foam material is higher than the application temperature at the force-application time approximately 0.01 to 0.001 seconds (i.e. with the frequency approximately from 100 to 1000 Hz), which indicates the foam material is in glassy state and behaves hard and rigid.

Figure 3:
FIG. 3 shows an energy absorbing foam material employed in the helmet in one embodiment of the present invention.

The energy absorbing foam material in the present invention is able to be employed in many applications, for example, but not limit to protective pads, protective layers, or any other objects with which the subjects might come into a serious impact. As shown in FIG. 3, the foam material provided in the present invention is utilized as protective pad in the helmet. When the subject put the helmet on, the protective pad is able to fit the profile and contact intimately to the head of the subject. If the helmet is taken off, the recovery time of the protective pad from head profile configuration, i.e. deformed configuration to the original configuration would take several hours. During wearing the helmet, if some impacts accidentally happen, the protective pad responses from non-impact resistant configuration to impact resistant configuration in a short time window to spread the impact force, then protect the wearer's head. Further, the final properties of the foam material described herein, such as elastic modulus, glass transition temperature, yield point and yield strength are controlled carefully by the foam composition for various applications.

EXAMPLES

Example 1

Reference is made to FIG. 1. In this embodiment, the present foam is selected from shape memory polyurethane foam, which is produced by mixing 100 g polyol (M.W.=800 g/mol, $F_n$=3), 1.6 g water, 1.2 g surfactant TEGOSTAB® B 8002 from Evonik, 0.3 g A33 catalyst, 0.15 g stannous octoate catalyst, and 70 g liquid MDI-50 which is a mixture of 50% 4 4'-methylenebis(phenyl isocyanate) and 50% 2,4-methylenebis(phenyl isocyanate).

In this example, the Dynamic Mechanical Analysis test was performed under 200 Hz (equal to the force application time of 0.005 s) and 0.1 Hz (equal to the force application time of 10 s) in compression mold with the heating scan from 20° C. to 50° C. at 3° C. per minute. At 35° C., the elastic modulus is about $5.3\times10^6$ Pa at 200 Hz and $4.5\times10^5$ Pa at 0.1 Hz respectively. Thus, the elastic modulus ratio between 200 Hz and 0.1 Hz of the present foam material is about 12 at 35° C. at 45° C., the elastic modulus is about $2.2\times10^6$ Pa at 200 Hz and $2\times10^4$ Pa at 0.1 Hz respectively. Thus, the elastic modulus ratio between 200 Hz and 0.1 Hz of the present foam material is about 110 at 45° C. The foam shows a first glass transition temperature equal to or lower than a working temperature (35~45° C.) in the first force-application time (0.1 Hz or 10 s), and a second glass transition temperature higher than a working temperature (35~45° C.) in the second force-application time (200 Hz or 0.005 s).

Example 2

Figure 4:
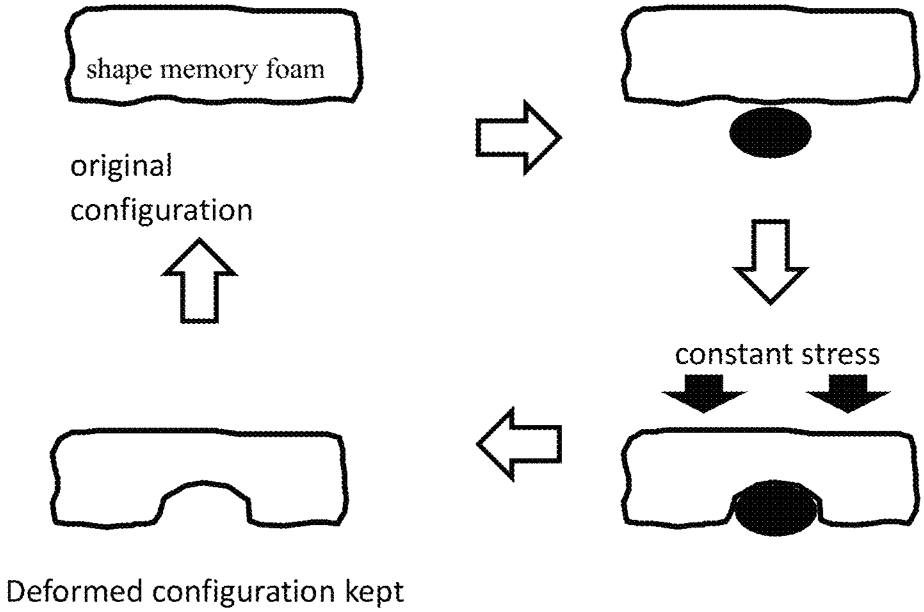
FIG. 4 schematically depicts a shape memory foam can easily be deformed to a new shape under constant stress in a slow way.

Referring to FIG. 4, the disclosed shape memory foam of Example 1 can easily be deformed to a new shape under constant stress (arrowhead in FIG. 4) in a slow way. The new shape can be "memorized" temporarily. Moreover, if the constant stress is removed, then it would take the shape memory foam several hours to recover from the deformed configuration to the original configuration.

Example 3

Figure 5:
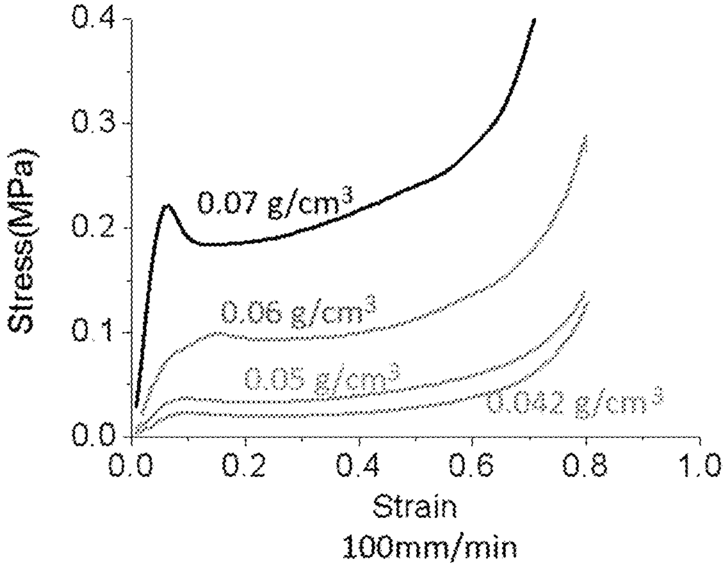
FIG. 5 shows the yield point of the foam materials during compression.

Referring to FIG. 5, in this embodiment, the present foam is selected from shape memory polyurethane foam, which is produced by mixing 100 g polyol (M.W.=800 g/mol, $F_n$=3), 1.6 g~3 g water, 1.2 g surfactant TEGOSTAB® B 8002 from Evonik, 0.3 g A33 catalyst, 0.15 g stannous octoate catalyst, and 70 g liquid MDI-50 which is a mixture of 50% 4 4'-methylenebis(phenyl isocyanate) and 50% 2,4-methylenebis(phenyl isocyanate). By adjusting the content of blowing agent (water) from 1.6 g to 3 g, the density of foam can be changed from 0.07 g/cm$^3$ to 0.04 g/cm$^3$. The yield point of the foam material is approximately from 25 kPa to 0.23 MPa. By adjusting the foam material and density, the yield point can be adjusted according to the specific application. Once the yield point is passed, some deformation will be easily made.

Comparative Example 1

In this embodiment, the present foam is selected from a high resilience flexible foam, which is produced by mixing 100 g polyol (M.W.=5000 g/mol, $F_n$=3), 1.6 g water, 1.2 g surfactant TEGOSTAB® B 8002 from Evonik, 0.3 g A33 catalyst, 0.15 g stannous octoate catalyst, and 30 g liquid MDI-50 which is a mixture of 50% 4 4'-methylenebis (phenyl isocyanate) and 50% 2,4-methylenebis(phenyl isocyanate). In this example, the Dynamic Mechanical Analysis test was performed under 200 Hz (equal to the force application time of 0.005 s) and 0.1 Hz (equal to the force application time of 10 s) in compression mold with the heating scan from 20° C. to 50° C. at 3° C. per minute. At 35° C. the elastic modulus is about $3\times10^4$ Pa and $2.5\times10^4$ Pa at 200 Hz and 0.1 Hz respectively. Thus the elastic modulus ratio between 200 Hz and 0.1 Hz of this foam material is only 1.2 at 35° C. The foam shows a glass transition temperature lower than the working temperature (35° C.) both in the first force-application time (0.1 Hz or 10 s) and in the second force-application time (200 Hz or 0.005 s).

Comparative Example 2

In this embodiment, the present foam is selected from a rigid foam, which is produced by mixing 100 g polyol (M.W.=500 g/mol, $F_n$=3), 1.6 g water, 1.2 g surfactant TEGOSTAB® B 8002 from Evonik, 0.3 g A33 catalyst, 0.15 g stannous octoate catalyst, and 99 g liquid MDI-50 which is a mixture of 50% 4 4'-methylenebis(phenyl isocyanate) and 50% 2,4-methylenebis(phenyl isocyanate). In this example, the Dynamic Mechanical Analysis test was performed under 200 Hz (equal to the force application time of 0.005 s) and 0.1 Hz (equal to the force application time of 10 s) in compression mold with the heating scan from 20° C. to 50° C. at 3° C. per minute. At 35° C., the elastic modulus is about $7.7\times10^6$ Pa and $7.2\times10^6$ Pa at 200 Hz and 0.1 Hz respectively. Thus the elastic modulus ratio between 200 Hz and 0.1 Hz of this foam material is only 1.1 at 35° C. The foam shows a glass transition temperature higher than the working temperature (35° C.) both in the first force-application time (0.1 Hz or 10 s) and in the second force-application time (200 Hz or 0.005 s).

The invention claimed is:

1. An energy absorbing foam material comprising:

at least one shape memory polymer foam comprising a non-impact resistant configuration in a first force-application time at a working temperature ranging from 15° C. to 55° C., an impact resistant configuration in a second force-application time at the working temperature, a first glass transition temperature equal to or lower than the working temperature in the first force-application time, and a second glass transition temperature higher than the working temperature in the second force-application time;

wherein the non-impact resistant configuration comprises a deformed configuration and an original configuration;

wherein a second elastic modulus of at least one shape memory polymer foam in the second force-application time is at least 10 times than a first elastic modulus of the at least one shape memory polymer foam in the first force-application time at the working temperature;

wherein the first force-application time is approximately from 0.1 second to 1000 seconds;

wherein the second force-application time is approximately below 0.1 second, wherein the at least one shape memory polymer foam is a polyurethane foam formed by a reaction between a polyol and a mixture of 4 4'-methylenebis (phenyl isocyanate) and 2,4'-methylenebis(phenyl isocyanate); and wherein the polyol content constitutes 55-70% of a total weight of the polyurethane foam, and the mixture of 4,4'-methylenebis (phenyl isocyanate) and 2,4'-methylenebis (phenyl isocyanate) content constitutes 25-45% of a total weight of the polyurethane foam.

2. The energy absorbing foam material of claim 1, wherein the yield point of the at least one shape memory polymer foam is approximately from 0.5 kPa to 1 MPa.

3. The energy absorbing foam material of claim 1, wherein the polyol and the mixture of 4,4'-methylenebis (phenyl isocyanate) and 2,4'-methylenebis(phenyl isocyanate) are provided in a weight ratio of 10:7 during said reaction.

4. The energy absorbing foam material of claim 1, wherein the mixture of 4,4'-methylenebis(phenyl isocyanate) and 2,4'-methylenebis(phenyl isocyanate) constitute 40-45% of the total weight of the polyurethane foam, and wherein the content of 4,4'-methylenebis(phenyl isocyanate) constitutes 40-60% of the total weight of the mixture and the content of 2,4'-methylenebis(phenyl isocyanate) constitutes 40-60% of the total weight of the mixture.

5. The energy absorbing foam material of claim 1, wherein the 4,4'-methylenebis(phenyl isocyanate), and the 2,4'-methylenebis(phenyl isocyanate) are provided in a weight ratio of 1:1 in said mixture.

6. The energy absorbing foam material of claim 1, wherein the second elastic modulus of at least one shape memory polymer foam in the second force-application time is 100 times than the first elastic modulus of the at least one shape memory polymer foam in the first force-application time at 45° C.

7. An impact-resistant article comprising the energy absorbing foam material of claim 1.

8. A method of molding the energy absorbing foam material of claim 1, comprising:

providing the energy absorbing foam material having an original shape, wherein the energy absorbing foam material is the polyurethane foam formed by the reaction between the polyol and the mixture of 4,4'-methylenebis (phenyl isocyanate) and 2,4'-methylenebis (phenyl isocyanate);

at a force-application time more than approximately 0.1 second to 1000 seconds and at a working temperature range approximately from 15 to 55° C., molding the energy absorbing foam material around a shape to be protected by the energy absorbing foam material;

using the molded energy absorbing foam material at a temperature range approximately from 15° C. to 55° C.;

self-recovering the original shape of the energy absorbing foam material without the application of force or heat;

wherein the polyol content constitutes 55-70% of a total weight of the polyurethane foam, and the mixture of 4,4'-methylenebis(phenyl isocyanate) and 2,4'-methylenebis(phenyl isocyanate) content constitutes 25-45% of a total weight of the polyurethane foam.

9. The method of molding the energy absorbing foam material of claim 8, wherein the polyol and the mixture of 4,4'-methylenebis(phenyl isocyanate) and 2,4'-methylenebis (phenyl isocyanate) have are provided in a weight ratio of 10:7 during said reaction.

10. The method of molding the energy absorbing foam material of claim 8, wherein the mixture of 4,4'-methylenebis(phenyl isocyanate) and 2,4'-methylenebis(phenyl isocyanate) constitute 40-45% of the total weight of the polyurethane foam, and wherein the content of 4,4'-methylenebis (phenyl isocyanate) constitutes 40-60% of the total weight of the mixture and the content of 2,4'-methylenebis(phenyl isocyanate) constitutes 40-60% of the total weight of the mixture.

11. The method of molding the energy absorbing foam material of claim 8, wherein the 4,4'-methylenebis(phenyl isocyanate) and the 2,4'-methylenebis(phenyl isocyanate) have are provided in a weight ratio of 1:1 in said mixture.

12. The method of molding the energy absorbing foam material of claim 8, wherein the yield point of the energy absorbing foam material is approximately from 25 kPa to 0.23 MPa.

* * * * *